US009975198B2

United States Patent
Fukizawa et al.

(10) Patent No.: US 9,975,198 B2
(45) Date of Patent: May 22, 2018

(54) CAP TIP DETACHMENT DEVICE

(71) Applicants: SHINKOKIKI CO., LTD., Nagoya-Shi (JP); P&C COMPANY LIMITED, Kuwana-Shi (JP)

(72) Inventors: Takeo Fukizawa, Nagoya (JP); Kazuyuki Harada, Kuwana (JP)

(73) Assignees: Shinkokiki Co., Ltd., Nagoya-Shi (JP); P&C Company Limited, Kuwana-Shi (JP)

( * ) Notice: Subject to any disclaimer, the term of this patent is extended or adjusted under 35 U.S.C. 154(b) by 0 days. days.

(21) Appl. No.: 15/451,848

(22) Filed: Mar. 7, 2017

(65) Prior Publication Data
US 2017/0173727 A1 Jun. 22, 2017

Related U.S. Application Data

(63) Continuation of application No. PCT/JP2014/078464, filed on Oct. 27, 2014.

(51) Int. Cl.
*B23K 11/30* (2006.01)
*B23K 11/11* (2006.01)

(52) U.S. Cl.
CPC ......... *B23K 11/3072* (2013.01); *B23K 11/115* (2013.01)

(58) Field of Classification Search
CPC . B23P 21/00; B25B 1/00; B25B 11/00; B23K 11/115; B23K 11/3072; B23K 11/31
See application file for complete search history.

(56) References Cited

U.S. PATENT DOCUMENTS 7,353,578 B2 * 4/2008 Nakajima .......... B23K 11/3072
29/238

FOREIGN PATENT DOCUMENTS

JP 2006-102798 A1 4/2006
JP 2006102798 A * 4/2006
JP 2011-125873 A1 6/2011

OTHER PUBLICATIONS

Machine translation JP 2006102798 A is attached.*
International Search Report and Written Opinion (PCT/JP2014/078464) dated Jan. 27, 2015.

* cited by examiner

Primary Examiner — Peter DungBa Vo
Assistant Examiner — John S Lowe
(74) Attorney, Agent, or Firm — Burr & Brown, PLLC

(57) ABSTRACT

The present invention relates to a cap tip detachment device capable of detaching cap tips which are fitted at the end of the shanks of a welding device. A pair of nail mounting boards, which mounts a fixed nail, a movable nail, and a slider, which is located between the nail mounting boards, are arranged on a linear rail. The movable nail of the pair of nail mounting boards includes a an arm extending toward an opposite side of a pivot shaft, and a spring that elastically urges the arm in a direction of separating from the nail mounting boards; and a distal end of each arm is abutted against the slider. When a shank is pushed against the fixed nail of one nail mounting board by a robot, the movable nails of both nail mounting boards open allowing the cap tip to be detached.

5 Claims, 8 Drawing Sheets

[Fig. 1]
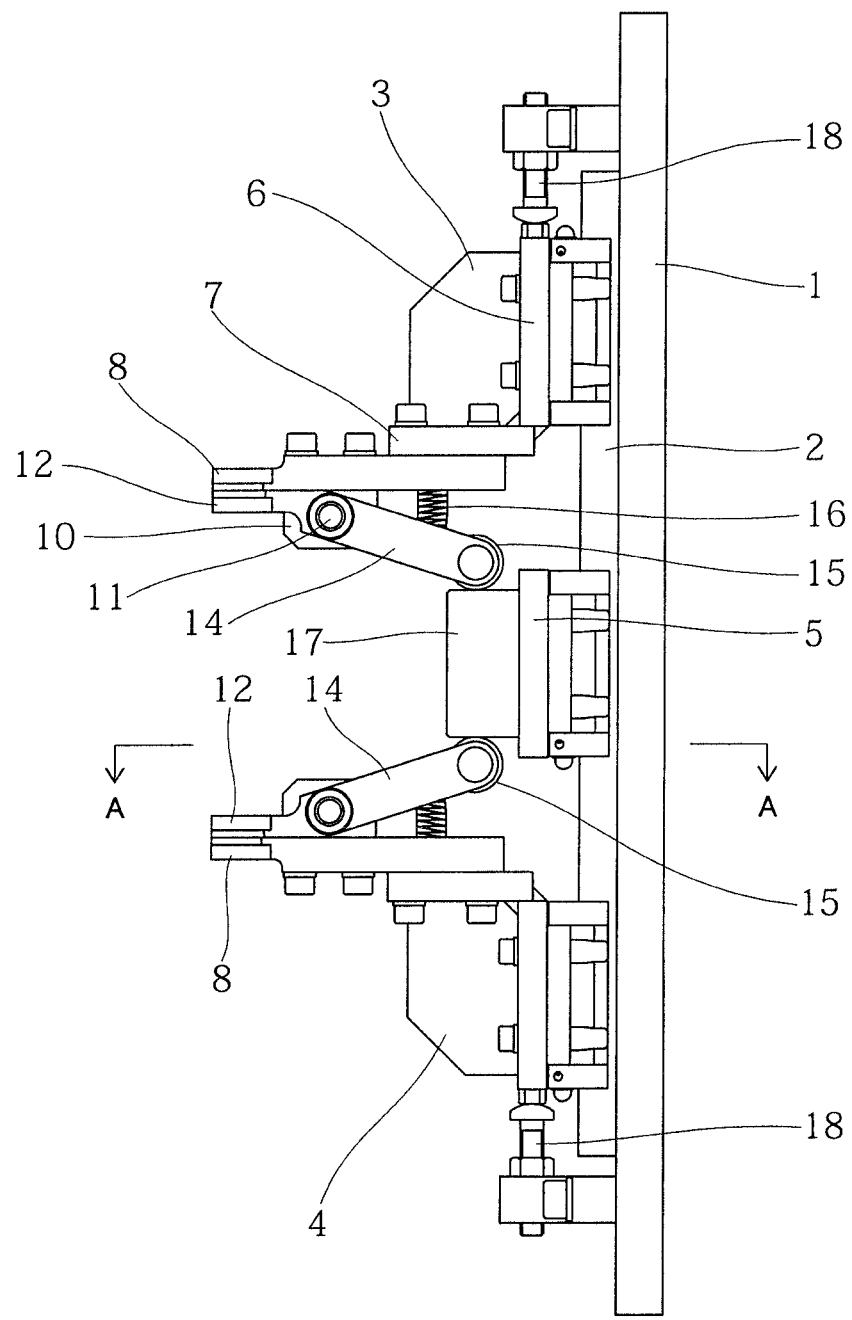

[Fig. 2]
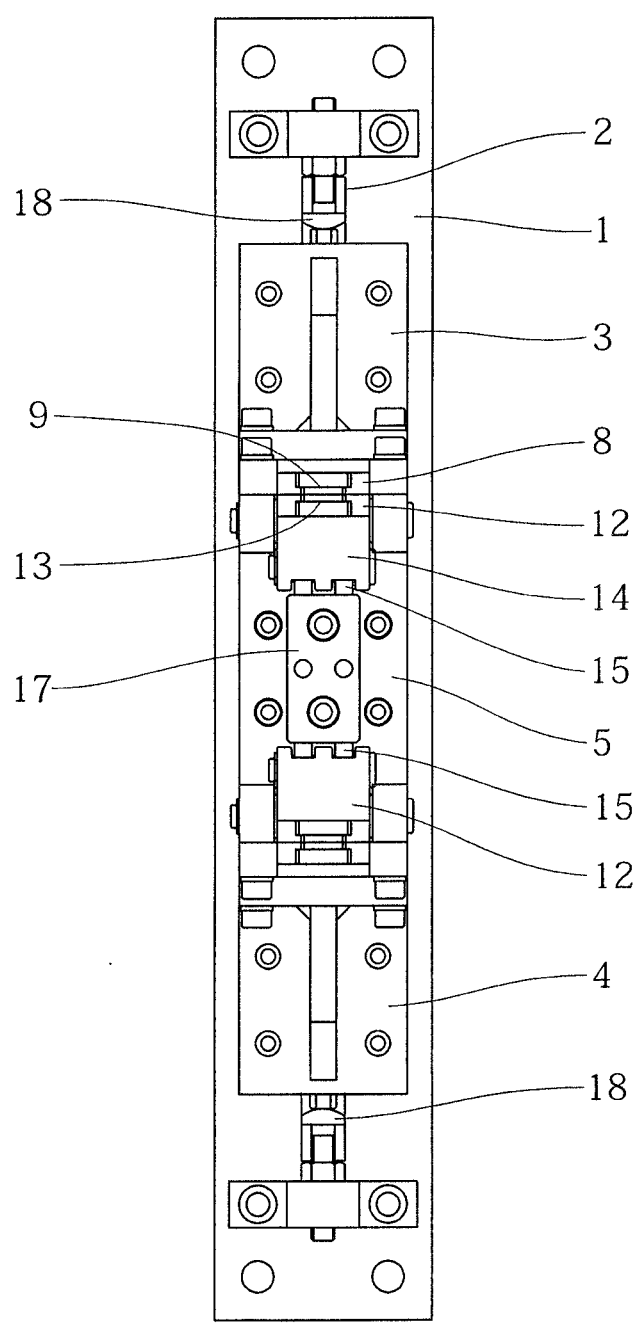

[Fig. 3]
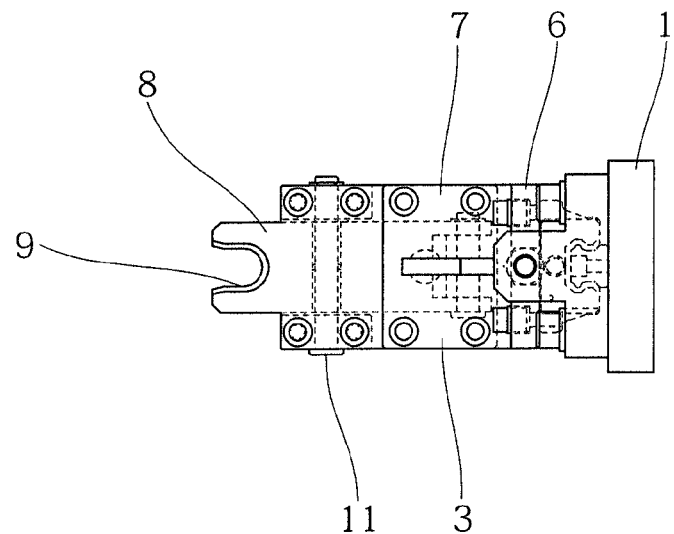
[Fig. 4]
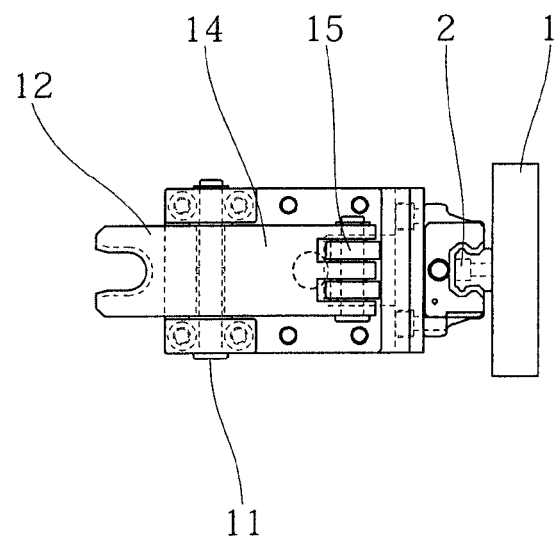

[Fig. 5]
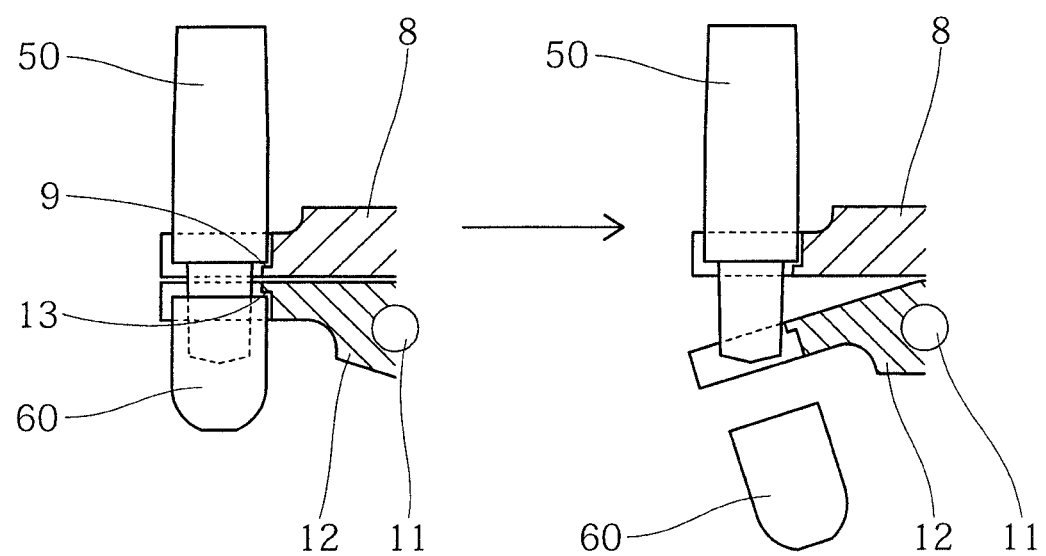

[Fig. 6]
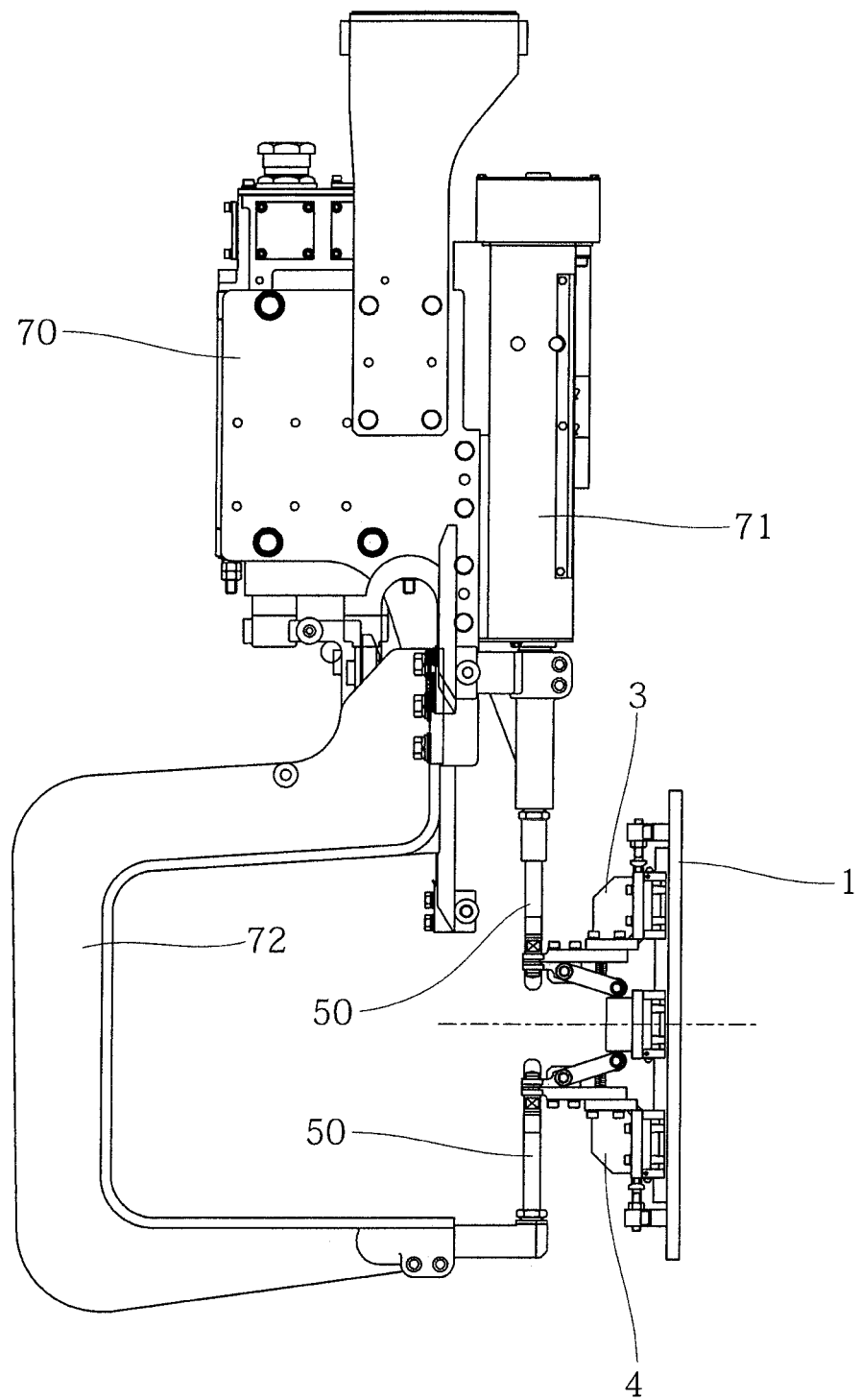

[Fig. 7]
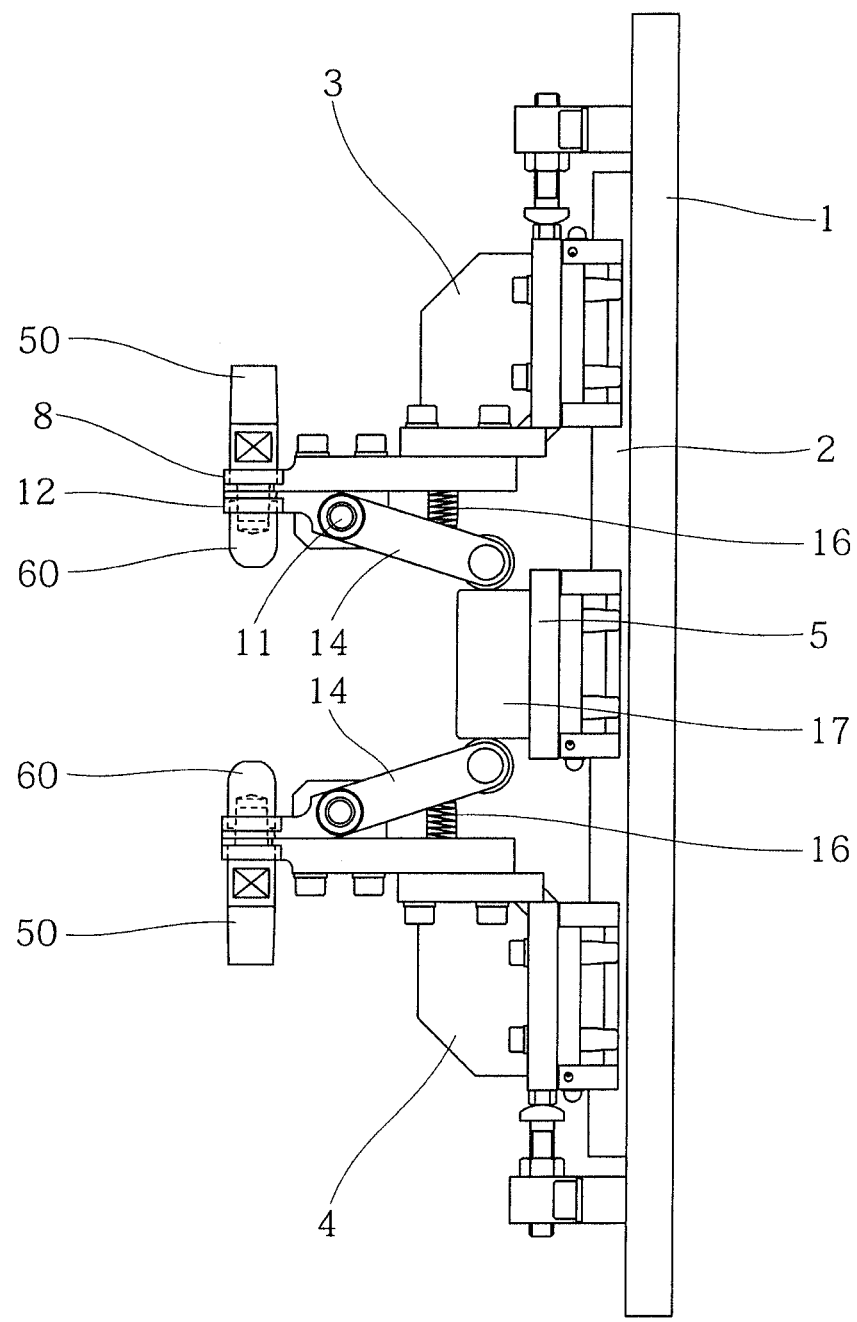

[Fig. 9]
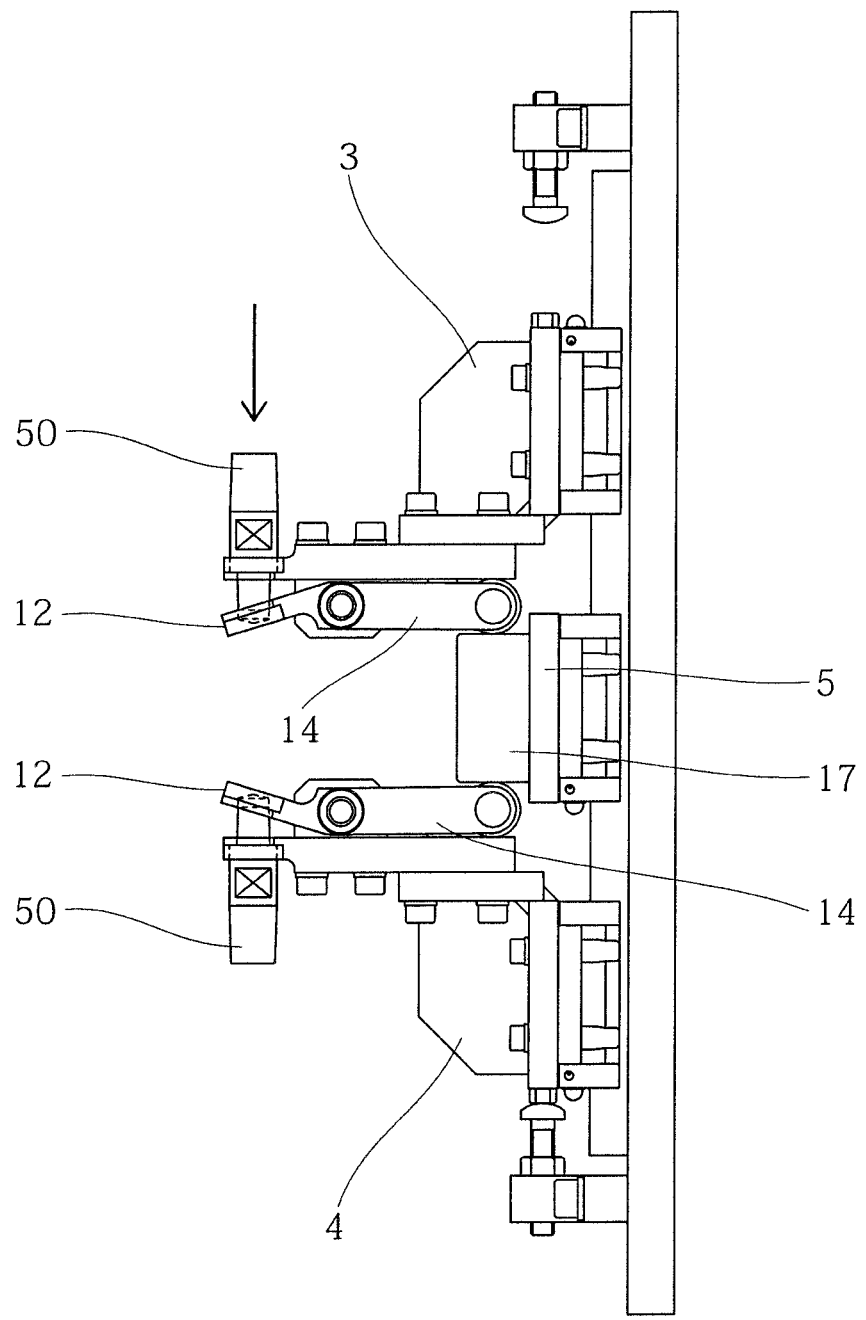

CAP TIP DETACHMENT DEVICE

BACKGROUND OF THE INVENTION

Field of the Invention

The present invention relates to a cap tip detachment device for detaching a cap tip fitted to a distal end of a shank of a welding device from the shank.

Description of Related Art

In an assembly line of an automobile, and the like, a welding device is attached to a distal end of a robot arm to automatically carry out spot welding. An electrode cap tip called a cap tip is fitted to a distal end of a shank of the welding device, and the spot welding is carried out so as to hold a welding region between the cap tips at the distal ends of a pair of shanks to flow electricity through the welding region.

The cap tip needs to be replaced periodically as it gradually deforms or wears when welding is repeated. Thus, a great number of cap tip detachment devices for inserting a distal end portion of the shank between a fixed nail and a movable nail, and opening the movable nail to detach the cap tip at the distal end of the shank has been developed and put to practical use.

For example, patent document 1 discloses a cap tip detachment device having a structure of opening/closing the movable nail by bringing a back end of an arm of the movable nail into contact with a wedge-shaped slide plate, and moving the slide plate forward and backward with a driving source such as a cylinder, and the like. Thus, the cap tip detachment device equipped with the driving source has been conventionally used, but such device has problems in that the facility cost and the operating cost are high as power supply and pressure source for driving the cap tip detachment device are required.

Patent document 2 discloses a cap tip detachment device having a structure of opening/closing the movable nail by having an operator operate a lever. Although such manual type cap tip detachment device is inexpensive, but has a problem in that the load of the operator increases.

Furthermore, since the shank of the welding device is used in pairs as described above, the cap tips are usually replaced simultaneously, where the devices of patent documents 1 and 2 have a problem in that a long operation time is required as the cap tip needs to be detached for each shank.

CITATION LIST

Patent Document

Patent document 1: Japanese Unexamined Patent Publication No. 2006-102798
Patent document 2: Japanese Unexamined Patent Publication No. 2011-125873

SUMMARY OF THE INVENTION

Problems to be Solved by the Invention

Therefore, it is an object of the present invention to overcome the conventional problems, and to provide a cap tip detachment device capable of simultaneously detaching cap tips from a pair of shanks without requiring a driving source and without depending on human power.

Means for Solving the Problems

The present invention provided to solve the problems described above relates to a cap tip detachment device for inserting a distal end portion of a shank between a fixed nail and a movable nail, and opening the movable nail to detach a cap tip at a distal end of the shank, the cap tip detachment device including a pair of nail mounting boards, on which the fixed nail and the movable nail are mounted, and a slider located between the nail mounting boards; wherein the nail mounting boards are arranged on a linear rail with the slider so that at least one of the nail mounting boards is slidable with the movable nail as a slider side; the movable nail includes a pivot shaft, an arm extending toward an opposite side of the pivot shaft, and a spring that elastically urges the arm in a direction of separating from the nail mounting board; and a distal end of each arm is abutted against the slider.

In a preferred embodiment, the pair of nail mounting boards and the slider are slidably arranged on the same linear rail. The pair of nail mounting boards can be arranged one above the other along a linear rail extending in a vertical direction. A stopper of the nail mounting board is preferably disposed at both ends of the linear rail.

Advantageous Effects of Invention

The cap tip detachment device of the present invention inserts the distal end portion of the shank of the welding device between the fixed nail and the movable nail of the pair of nail mounting boards with the robot arm, and then moves the shank with the shank moving mechanism of the welding device and slides the slidable nail mounting board toward the other nail mounting board, so that the arm of the movable nail is pushed in against the spring thus opening the movable nail. When the slidable nail mounting board is further sled in such state, the slider is also sled toward the other nail mounting board, so that the arm of the movable nail of the other nail mounting board is also pushed in against the spring thus opening the movable nail. Therefore, the movable nail of the other nail mounting board is also opened in cooperation by simply sliding the slidable nail mounting board toward the other nail mounting board with the shank moving mechanism, whereby the detachment of the cap tip from a pair of welding guns can be carried out almost simultaneously.

Furthermore, the cap tip detachment device of the present invention is driven by the shank moving mechanism of the welding device attached to the robot arm, and has an advantage in that the cap tip detachment device does not require a driving source and does not need to rely on human power. The manufacturing cost is thus inexpensive, and the operation cost is also not high.

BRIEF DESCRIPTION OF THE DRAWINGS

FIG. 1 is a front view showing a cap tip detachment device of an embodiment;
FIG. 2 is a left side view of FIG. 1;
FIG. 3 is a top view of FIG. 1;
FIG. 4 is a cross-sectional view taken along line A-A of FIG. 1;
FIG. 5 is a partial enlarged view showing a movement of a movable nail;

FIG. 6 is an overall view showing a usage state;

FIG. 7 is a front view showing a state in which a shank is inserted to the movable nail and a fixed nail;

FIG. 9 is a front view showing a state in which the shank is further pushed down.

DETAILED DESCRIPTION OF THE INVENTION

Examples

Figure 8:
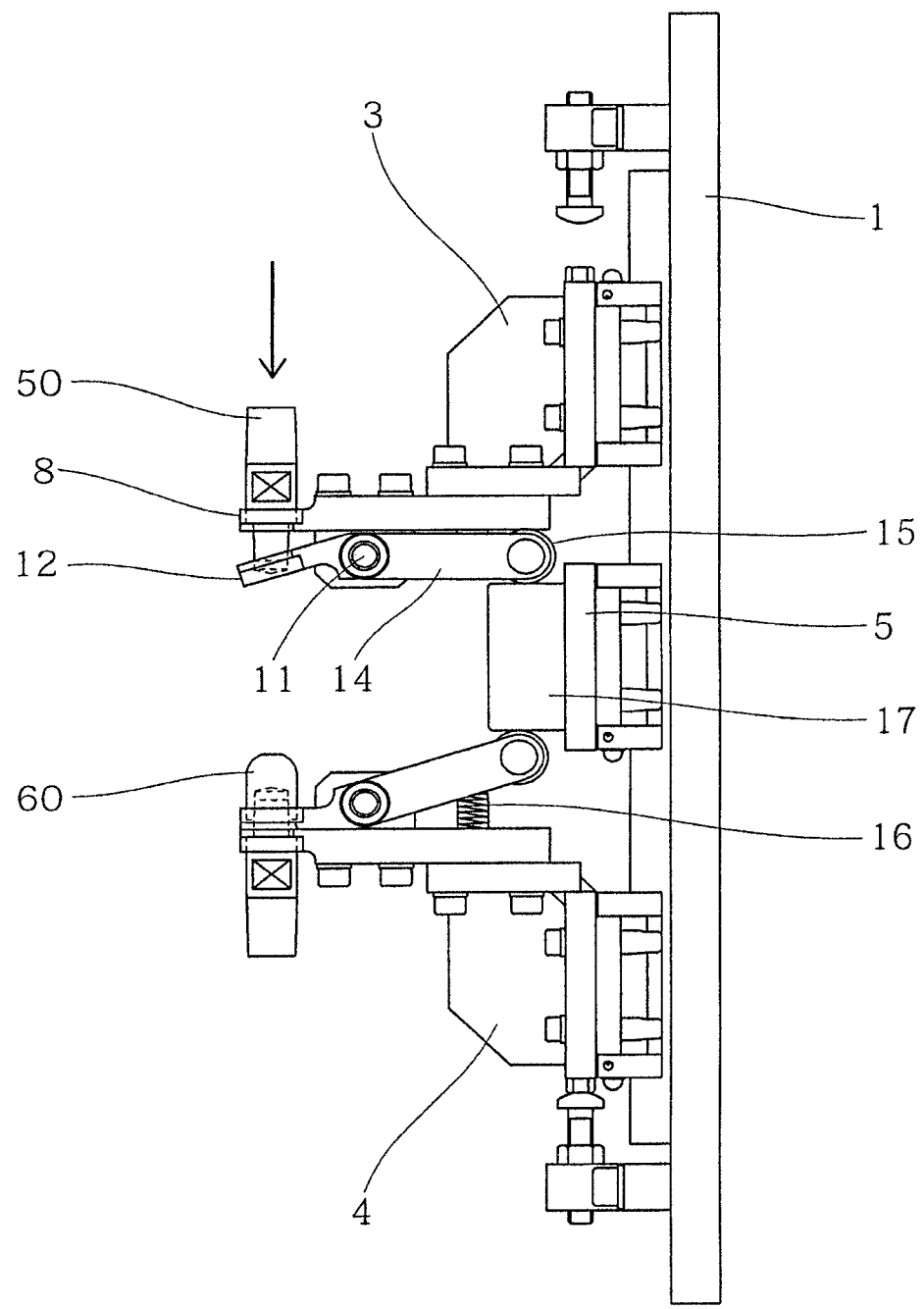
FIG. 8 is a front view showing a state in which the shank is pushed down.

An embodiment of the present invention will be hereinafter described.

FIG. 1 is a front view showing a cap tip detachment device of an embodiment of the present invention, and FIG. 2 is a left side view thereof. Reference numeral 1 is denoted for a flat plate shaped base, and 2 is denoted for a linear rail fixed to a front surface of the base 1. In the embodiment, the linear rail 2 is perpendicularly arranged to extend in a vertical direction, but the linear rail 2 may be horizontally arranged to extend in a horizontal direction or may be arranged diagonally. A pair of upper and lower nail mounting boards 3, 4, and a slider 5 located between the nail mounting boards 3, 4 are arranged on the linear rail 2. The nail mounting boards 3, 4 have the same structure other than that the respective orientations are reversed, and hence the structure of the nail mounting board 3 on the upper side will be described.

The nail mounting board 3 has a wall surface 7 perpendicular to the base 1 formed at an end of a flat plate 6 parallel to the base 1, and a fixed nail 8 attached to the wall surface 7. As shown in FIG. 3, the fixed nail 8 includes a U-shaped stepped recess 9, thus allowing a distal end of a shank 50 to be fitted into the recess 9, as shown in FIG. 5. The fixed nail 8 is attached to the wall surface 7 with a bolt, and can be replaced according to the size of the shank 50. The shank 50 is a part of a welding device attached to a robot arm, and can be freely moved by the robot arm.

A pair of bearings 10 is arranged in a projecting manner on a back surface of the wall surface 7, and a movable nail 12 is supported by a pivot shaft 11 supported by the bearings 10. The movable nail 12 also includes a U-shaped stepped recess 13 at a distal end portion, thus realizing a structure of receiving an end face of a cap tip 60 at the distal end of the shank 50 as shown in FIG. 5.

As shown in FIG. 1, the movable nail 12 includes an arm 14 on an opposite side over the pivot shaft 11. As shown in FIG. 1, the arm 14 extends diagonally in a direction of separating away from the nail mounting board 3 in a closed state so that the movable nail 12 closely attaches to the fixed nail 8, and a roller 15 is disposed at the distal end thereof. A spring 16 that elastically urges the arm 14 in the direction of separating away from the nail mounting board 3 is arranged between the arm 14 of the movable nail 12 and the fixed nail 8. The elastic force of the spring 16 causes the distal end of the arm 14 to be brought into contact with a projection 17 of the slider 5 by way of the roller 15.

The nail mounting board 4 on the lower side also has the same structure as the nail mounting board 3 described above, but the orientation is reversed, and the movable nail 12 is arranged to face the slider 5 on an inner side of the pair of nail mounting boards 3, 4. In other words, in the present embodiment, the movable nail 12 of the nail mounting board 3 on the upper side is the lower side, the movable nail 12 of the nail mounting board 4 on the lower side is the upper side, and the rollers 15 at the distal ends of the arms 14 are abutted against both upper and lower surfaces of the projection 17 of the intermediate slider 5.

When the linear rail 2 is perpendicularly arranged as shown in FIG. 1, the nail mounting boards 3, 4 may slide toward the lower side by its own weight. However, the nail mounting board 4 on the lower side is inhibited from moving toward the lower side by a stopper 18. The nail mounting board 3 on the upper side can maintain the position of FIG. 1 if the strength of the spring 16 is sufficiently strong, but can also be pulled up to the position of FIG. 1 by an auxiliary spring (not shown) if the force of the spring 16 is insufficient. When horizontally arranged entirely, the sliding by its own weight does not need to be taken into consideration, but stoppers 18, 18 are preferably arranged at both ends of the linear rail 2 to regulate initial positions of the nail mounting boards 3, 4.

In the present embodiment, the nail mounting boards 3, 4 are both arranged in a freely slidable manner on the linear rail 2, but the nail mounting board on one side may be fixed.

The operation of the cap tip detachment device of the present invention will be hereinafter described.

As shown in FIG. 6, upper and lower shanks 50 are attached to a welding device 70, and the entire welding device 70 is movable by the robot arm. In the welding device 70 of FIG. 6, the shank 50 on the upper side is movable by a shank moving mechanism 71, and the shank 50 on the lower side is fixed to a distal end of a C-shaped arm 72. In the present embodiment, the cap tip detachment device of the present invention is fixed at a predetermined location, and the robot arm moves the upper and lower shanks 50 with the welding device 70 as shown in FIG. 6 to insert the cap tip 60 at the distal end to inside of the stepped recesses 9, 13 of the fixed nail 8 and the movable nail 12 of the nail mounting boards 3, 4. This state is shown in FIG. 7.

When the shank 50 on the upper side is moved in the direction of the shank 50 on the lower side by the shank moving mechanism 71 from the above state, the shank 50 is pushed thus lowering the nail mounting board 3 on the upper side with the fixed nail 8 as shown in FIG. 8, and accompanying therewith, the movable nail 12 is rotated with the pivot shaft 11 as the center, and the cap tip 60 is detached from the shank 50 on the upper side. When the shank 50 on the upper side is further moved in the direction of the shank 50 on the lower side, the movable nail 12 of the nail mounting board 4 on the lower side is also rotated through the slider 5, as shown in FIG. 9, and the cap tip 60 is detached from the shank 50 on the lower side.

In this description, the slider 5 has been described as being stopped until the state of FIG. 8, but actually, when the nail mounting board 3 on the upper side lowers, the slider 5 also starts to lower accompanying therewith, and hence when the upper cap tip 60 is detached halfway through, the lower cap tip 60 also started detached.

Therefore, the cap tip detachment device of the present invention itself does not require a driving source, and can simultaneously detach the cap tips from the shanks of a pair of welding guns by simply moving the shank 50 on one side toward the shank 50 on the opposite side using the shank moving mechanism 71 on the robot side.

In the embodiment described above, the cap tip detachment device of the present invention is fixed and the shank 50 is moved to the cap tip detachment device by the robot arm to detach the cap tip 60, but on the contrary, the cap tip detachment device of the present invention may be attached to the distal end of the robot arm, and moved up to the welding device to detach the cap tip.

The timing of detaching the two cap tips 60 can be slightly shifted by arranging the slider 5, thus alleviating the load of the shank moving mechanism 71.

DESCRIPTION OF SYMBOLS

1 base
2 linear rail
3 nail mounting board
4 nail mounting board
5 slider
6 flat plate
7 wall surface
8 fixed nail
9 stepped recess
10 bearing
11 pivot shaft
12 movable nail
13 stepped recess
14 arm
15 roller
16 spring
17 projection
18 stopper
50 shank
60 cap tip
70 welding device
71 shank moving mechanism

The invention claimed is:

1. A cap tip detachment device for inserting a distal end portion of a shank between a fixed nail and a movable nail, and opening the movable nail to detach a cap tip at a distal end of the shank, the cap tip detachment device comprising:

a pair of nail mounting boards, on which the fixed nail and the movable nail are respectively mounted, and a slider located between the nail mounting boards; wherein the nail mounting boards are arranged at opposite distal ends of a linear rail having a sliding direction, with the slider therebetween, so as to be slidable relative to one another on the linear rail, such that on the linear rail at least one of the nail mounting boards and the slider are slidable, with the nail mounting boards each having the movable nail arranged on a slider side;

each movable nail includes a pivot shaft as a rotatable center, an arm extending towards an opposite side of the pivot shaft such that a distal end of the arm is arranged opposite to a protection in the slider, and a spring that elastically urges the arm in a direction of separating the distal end of the arm away from the nail mounting board; and the distal end of each arm is abutted against the projection in the slider, such that in use when the at least one of the nail mounting boards is slid on the linear rail towards the slider, the distal end of the arm is pushed by the projection in the slider such that the arm compresses the spring so as to have the distal end of the arm move in a direction towards the at least one of the nail mounting boards to open the movable nail.

2. The cap tip detachment device according to claim 1, wherein the pair of nail mounting boards and the slider are slidably arranged on the same linear rail.

3. The cap tip detachment device according to claim 1, wherein the sliding direction of the linear rail extends in a vertical direction, such that the pair of nail mounting boards are arranged one above the other with the slider therebetween on the linear rail.

4. The cap tip detachment device according to claim 1, wherein a stopper for each nail mounting board is disposed at each end of the linear rail.

5. The cap tip detachment device according to claim 1, wherein the projection in the slider has a block-shaped main body that has on respectively opposite sides first and second side surfaces that extend in a direction perpendicular to the sliding direction of the linear rail, such that the distal ends of the arms arranged opposite to the projection in the slider are abutted against the first and second side surfaces.

* * * * *